United States Patent [19]
Brown et al.

[11] Patent Number: 6,114,437
[45] Date of Patent: Sep. 5, 2000

[54] POLYCARBONATE ARTICLES WITH PHOTOCHROMIC PROPERTIES

[75] Inventors: Michael W. Brown; Douglas G. Hamilton, both of Mt. Vernon; Rodney L. Michel; John G. Skabardonis, both of Evansville, all of Ind.

[73] Assignee: General Electric Company, Schenectady, N.Y.

[21] Appl. No.: 09/018,296

[22] Filed: Feb. 4, 1998

[51] Int. Cl.[7] .......................................... C08K 3/10
[52] U.S. Cl. ............................. 524/786; 523/171
[58] Field of Search .............................. 524/786; 523/171

[56] References Cited

U.S. PATENT DOCUMENTS

| | | |
|---|---|---|
| 2,999,835 | 9/1961 | Goldberg . |
| 3,027,814 | 4/1962 | Schnellmann . |
| 3,028,365 | 4/1962 | Schnell et al. . |
| 3,030,331 | 4/1962 | Goldberg . |
| 3,153,008 | 10/1964 | Fox . |
| 3,169,121 | 2/1965 | Goldberg . |
| 3,275,601 | 9/1966 | Schnell et al. . |
| 3,334,154 | 8/1967 | Kim . |
| 3,635,395 | 1/1972 | Kramer . |
| 3,915,926 | 10/1975 | Wambach . |
| 4,001,184 | 1/1977 | Scott . |
| 4,035,527 | 7/1977 | Deeg . |
| 4,188,314 | 2/1980 | Fox et al. . |
| 4,268,134 | 5/1981 | Gulati et al. . |
| 4,374,931 | 2/1983 | Courbin et al. . |
| 4,487,896 | 12/1984 | Mark et al. . |
| 4,612,362 | 9/1986 | Lai et al. .................................. 528/190 |
| 4,851,530 | 7/1989 | Rickwood . |
| 4,883,548 | 11/1989 | Onoki . |
| 4,898,706 | 2/1990 | Yabe et al. . |
| 4,913,544 | 4/1990 | Rickwood et al. . |
| 4,961,894 | 10/1990 | Yabe et al. . |
| 5,219,497 | 6/1993 | Blum . |
| 5,252,450 | 10/1993 | Schwerzel et al. . |
| 5,268,231 | 12/1993 | Knapp-Hayes . |
| 5,531,940 | 7/1996 | Gupta et al. . |
| 5,673,251 | 9/1997 | Suzuki et al. ......................... 368/275.4 |

FOREIGN PATENT DOCUMENTS

| | | |
|---|---|---|
| 43 04 488 | 6/1994 | Germany . |
| 51-022687 | 2/1976 | Japan . |
| 61-005910 | 1/1986 | Japan . |
| 1-156739 | 6/1989 | Japan . |
| 92 13927 | 8/1992 | WIPO . |
| WO 92 13927 | 8/1992 | WIPO . |
| WO 96/27496 | 9/1996 | WIPO . |

OTHER PUBLICATIONS

European Search Report for Application No. EP 99 30 0532.

*Primary Examiner*—Edward J. Cain

[57] ABSTRACT

Polychromic articles are manufactured by solvent casting polycarbonate resins previously mixed with a photochromic dye and evaporating the solvent. The films produced can be insert injection molded with polycarbonate substrates to obtain photochromic articles.

27 Claims, 1 Drawing Sheet

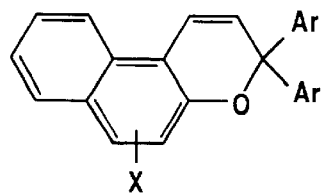
GENERALIZED CHROMENE STRUCTURE
Fig.1
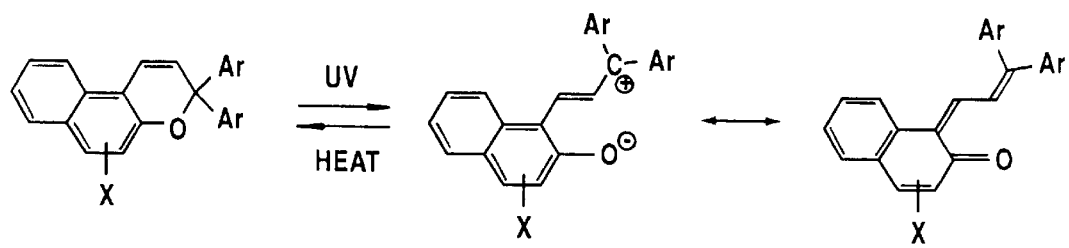
CHROMENE REARRANGEMENT
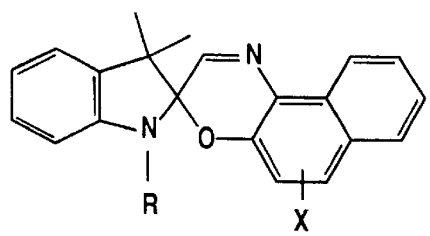
GENERALIZED SPIROXAZINE STRUCTURE
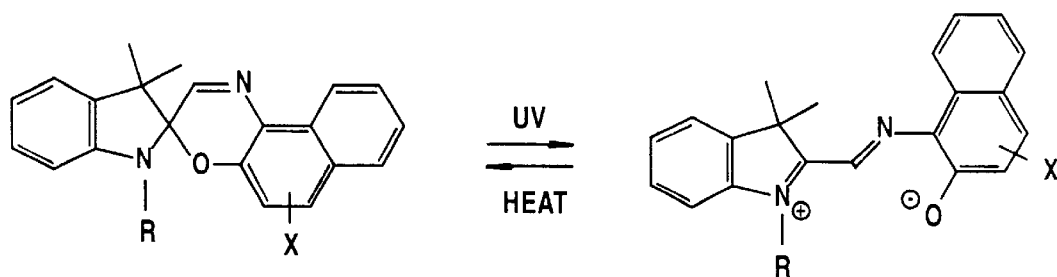
SPIROXAZINE REARRANGEMENT

POLYCARBONATE ARTICLES WITH PHOTOCHROMIC PROPERTIES

BACKGROUND OF THE INVENTION

The invention relates to polycarbonate resins and more particularly to polycarbonate resin molded articles. This invention further relates to polycarbonate resin molded articles comprising dyes, which may be photochromic, and/or metallic particles.

Polycarbonate is an amorphous, thermoplastic resin that has properties desirable for many articles. For example, glazings, lenses and automotive headlight lenses made of polycarbonate have high impact resistance and strength. Polycarbonate resin also can be highly transparent and has a desirably high refractive index. Furthermore, the thermal properties of polycarbonate resin makes the resin conducive to processing by conventional techniques, such as injection molding. However, there are also various shortcomings relating to polycarbonate articles. For example, no method presently exists for making high quality dyed or photochromic dyed polycarbonate articles such as glazings. Moreover, no method presently exists for making high quality polycarbonate articles that possess a metallic, or glitter appearance.

Two current methods of incorporating organic dyes into thermoplastic materials, such as polycarbonate, involve either inclusion of organic dye throughout the molded thermoplastic material or imbibition of dye into a surface of the thermoplastic material. Existing techniques, such as injection molding, for including organic dyes throughout thermoplastic materials, such as polycarbonate, typically do not yield satisfactory results. The unsatisfactory results occur for several reasons, including the relatively high temperatures required for satisfactory injection molding and the relatively high glass transition temperatures of polycarbonate. For example, photochromic dyes such as naphthopyrans, spironaphthopyrans, and spirooxazines that are co-melted with polycarbonate typically break down when exposed to the relatively high temperatures present during polymer melting. As another example, polycarbonate has a stiff molecular structure that is reflected by the relatively high glass transition temperature. Therefore, even in the absence of photochromic compound break down, the stiff molecular structure of polycarbonate substantially inhibits full activation of the photochromic dye, since the photochromic dye must go through a geometric transformation in the polycarbonate to activate.

Imbibition of dyes into surfaces of polycarbonate also yields unsatisfactory results, related to the relatively high glass transition temperatures of polycarbonate. It is thought that the stiff molecular structure prevents dye from penetrating the polycarbonate. Modification of the surface structure of polycarbonate resin by treatment with a solvent is said to improve imbibition of dyes into polycarbonate. U.S. Pat. No. 5,268,231 discloses that cyclohexanone is an effective solvent for modifying the polycarbonate surface structure to accept dyes. However, the method described leaves the surface of the polycarbonate with a rough, orange-peel type texture that is unacceptable for many purposes.

Approaches to manufacturing photochromic articles from thermoplastic resin materials and to avoid thermal degradation to the dye additive have also included molding of the articles by room temperature casting techniques; see for example the descriptions in U.S. Pat. Nos. 5,219,497 and 5,531,940. However, in many instances it is desirable to use thermal processing techniques.

The Japanese Patent Application No. 59-128192 filed Jun. 21, 1984 and laid open on Jan. 11, 1986 describes films with photochromic additives that are inserted into a mold following which the mold is filled (insert-injection molding). However, the films used (with photochromic properties) are prepared by imbibing, or coating a pre-formed film. The photochromic colorants are not homogeneously dispersed in the film and lack the quality of a homogeneous dispersion.

Approaches to manufacturing polycarbonate articles that have a metallic, or glitter appearance have thus far been largely unsuccessful because metallic additives cause degradation of polycarbonate at high temperatures. Moreover, relatively high loading of a metal is typically required to produce a metallic appearance, which exacerbates the degradation problem. It would be desirable to produce semi-transparent polycarbonate articles having a metallic appearance, but a relatively low metal loading, for applications such as sunglasses. It would also be desirable if such metallic polycarbonate articles were also photochromic.

The method of the present invention disperses homogeneously throughout a solvated polycarbonate resin, the dyes, which may be photochromic, and/or a metallic additive. The solvent mixture is then cast to form a film of polycarbonate having the dye and/or metallic additive homogeneously dispersed therein. The cast film can be placed in a mold against a mold wall and a substrate resin injected into the mold behind the insert. The article is thus molded without exposing the dye to high temperature for long periods of time, thus avoiding degradation of the dye.

SUMMARY OF THE INVENTION

The present invention comprises a process for the manufacture of a dyed and/or metallic polycarbonate resin blends and articles, which comprise;

dissolving a thermoplastic, aromatic polycarbonate resin in an organic solvent;

homogeneously mixing with the dissolved resin, an effective proportion of a photochromic dye, and/or an effective proportion of a metallic additive to impart a metallic appearance to the article and/or an effective proportion of a dye that is not photochromic;

casting a film of the mixture; and removing the solvent.

The cast film can be inserted into a mold against a mold wall and insert-molded to a polycarbonate resin substrate.

BRIEF DESCRIPTION OF THE DRAWINGS

FIG. 1 depicts the generalized structures of Chromene and Spiroxazine photochromic dyes.

DETAILED DESCRIPTION OF THE INVENTION

The aromatic carbonate polymers useful in the invention are polycarbonates. The method of preparation of polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0 C, to above 100 C. The phosgenation reaction preferably proceeds at temperatures of from room temperatures (25 C) to 50 C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

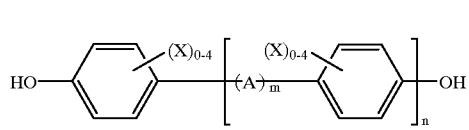

(I)

wherein A is a divalent hydrocarbon radical containing from 1 to about 15 carbon atoms; a substituted divalent hydrocarbon radical containing from 1 to about 15 carbon atoms and substituent groups such as halogen;

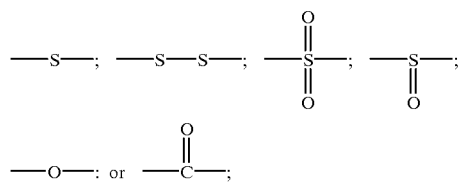

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the practice of the present invention are bisphenols such as (4-hydroxy-phenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxy-phenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The term "polycarbonate" as used herein is inclusive of copolyester-polycarbonates, i.e., resins which contain, in addition to recurring polycarbonate chain units of the formula:

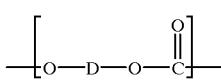

(IIa)

wherein D is a divalent aromatic radical of the dihydric phenol employed in the polymerization reaction, repeating or recurring carboxylate units, for example of the formula:

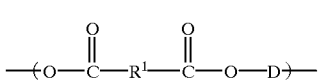

(IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$\text{HOOC—R}^1\text{—COOH} \tag{III}$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

herein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene; a sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

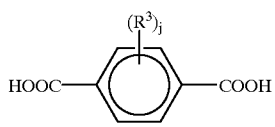

wherein j is a positive whole integer having a value of from 0 to 4 inclusive; and each $R^3$ is independently selected from the group consisting of alkyl radicals, preferably lower alkyl (1 to about 6 carbon atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

Any polycarbonate resin which is mold-injectable may be used as the substrate component to manufacture articles of the invention bearing a polycarbonate film containing a dispersion of the photochromic dyes. The preferred polycarbonate resin for injection molding is derived from bisphenol A and phosgene and having an intrinsic viscosity of about 0.3 to about 1.5 deciliters per gram in methylene chloride at 25.

The polycarbonate resin employed for admixture with the photochromic dye and cast to obtain the film for mold insertion is advantageously a relatively high molecular weight polyester-carbonate resin free of haze objections. These preferred resins for casting a film are derived from (i) at least one dihydric phenol, (ii) a carbonate precursor, and (iii) a minor amount of an aromatic ester precursor. The preferred aromatic ester precursor is selected from the group consisting of isophthalic acid;
terephthalic acid;
isophthaloyl dichloride; and
terephthaloyl dichoride.

In the practice of the instant invention only one aromatic ester precursor is used or a mixture of two or more different ester precursors may be employed.

The amount of the aromatic ester precursor used in the preparation of the low haze carbonate polymers is an optical property improving amount. By optical property improving amount is meant an amount which is effective to improve the optical properties of the solvent cast films, i.e., effective to reduce the haze of said films. Generally this amount is from about 1 to about 10 mole percent, preferably from about 2 to about 9 mole percent, and more preferably from about 3 to about 8 mole percent. Mole percent of the aromatic ester precursor is based on the total amounts of said ester precursor and said dihydric phenol utilized in the preparation of the carbonate polymer.

Generally, if less than about one mole percent of said ester precursor is used there is no significant improvement in the optical properties of the film. If more than about 10 mole percent of said ester precursor is used the polymer begins to lose the advantageous properties exhibited by polycarbonate resins.

The instant high molecular weight solvent casting aromatic carbonate polymer contains recurring carbonate groups, carboxylate groups, and aromatic carbocyclic groups in the polymer chain in which at least some of the carbonate groups and at least some of the carboxylate groups are bonded directly to the ring carbon atoms of the aromatic carbocyclic groups.

The haze reduced carbonate polymers contain ester bonds and carbonate bonds in the polymer chain wherein the amount of the ester bonds is in the range of from about 1 to about 10 mole percent, preferably from about 2 to about 9 mole percent, and more preferably from about 3 to about 8 mole percent. For example, 5 moles of bisphenol-A reacting completely with 0–5 mole of isophthaloyl dichloride and 4.5 mole of phosgene would give a carbonate polymer of 10 mole percent ester bonds.

The haze reduced carbonate polymers contain at least the following two recurring structural units:

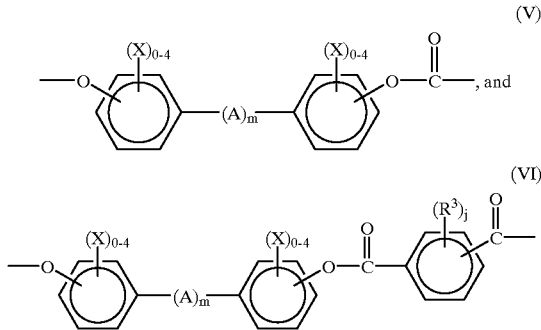

wherein X, A, m, R³ and j are as defined herein-before.

Units VI are present in amounts of from about 1 to about 10 mole percent, based on the total amounts of units V and VI present, depending on the amounts of the aromatic ester precursor used.

The reduced haze high molecular weight thermoplastic aromatic carbonate polymers for mixing with the photochromic dyes generally have an intrinsic viscosity, as measured in methylene chloride at 25 C, of at least about 0.5 d/g, preferably at least about 0.6 d/g.

In accordance with the process of the present invention, the polycarbonate resin employed for cold-casting a film is first dissolved in an organic solvent. Any inert organic solvent may be used. An inert organic solvent is any that does not enter into reaction with the mixture components or adversely affects them. A preferred solvent is methylene chloride. A resin concentration in the organic solution is advantageously within the range of from about 1.0 to about 25 percent by weight.

To the polycarbonate resin solution, there is homogeneously mixed an effective proportion of a dye to impart color to a film and/or a photochromic effective proportion of a photochromic dye, and/or a proportion of a metallic additive that is effective to impart a metallic or glitter appearance to the film. An effective proportion of dye is generally within the range of from about 0.1 to about 10.0 percent by weight of the resin preferably 0.1 to 0.3%. An effective proportion of metallic additive is preferably 0.1 to 5.0% by weight of the resin. Mixing is carried out at room temperature.

The solvent cast films of the instant invention may be prepared by the conventional and well known solvent casting process which comprises pouring the solution into a template, and evaporating the solvent to form the film. Preferably evaporation is at room temperatures. These films generally have a thickness of from about 0.5 to about 25 mils, preferably from about 1 to about 15 mils.

Photochromic dyes are a well known class of compounds, as are methods of their preparation.

Examples of naphthopyran compounds suitable for imparting photochromic properties may be represented by formula (VII) as follows:

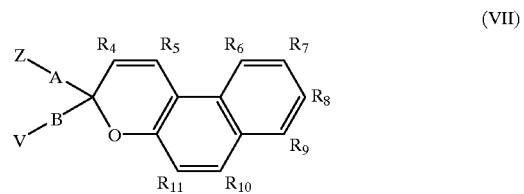

wherein $R_4$, $R_5$, $R_6$, $R_7$, $R_8$, $R_9$, $R_{10}$, and $R_{11}$, respectively, may be hydrogen; a stable organic radical, such as alkyl, alkoxy, unsubstituted or substituted phenyl, naphthyl, cycloalkyl, furyl, alkoyl, alkoyloxy, aroyl, aroyloxy; a heterocyclic group: halogen; a nitrogen-substituted group, such as amino or nitro; or a nitrogen-substituted ring compound, such as morpholino, piperidino, or piperazino; Z is hydrogen, a substituted phenyl group or a substituted naphthyl group; and V is hydrogen, a substituted phenyl group or a substituted naphthyl group, provided that at least one of Z and V is substituted phenyl or substituted naphthyl. The substituents of any phenyl or naphthyl group or groups at Z or V are selected from the following: a stable organic radical, such as alkyl, alkoxy, unsubstituted or substituted phenyl, naphthyl, cycloalkyl, furyl, alkoyl, alkoyloxy, aroyl, aroyloxy; a heterocyclic group; halogen; a nitrogen-substituted group, such as amino or nitro; and a nitrogen-substituted ring compound, such as morpholino, piperidino, or piperazino; provided that at least one substituent of at least one substituted phenyl or substituted naphthyl at either A or B is phenyl, naphthyl or furyl.

Preferred naphthopyran compounds include 3-(4-biphenylyl) -3-phenyl-8-methoxy-3H-naphtho [2,1b]pyran, 3-(4-biphenylyl)-3-phenyl-3H-naphtho-[2,1b] pyran and 3,3-di(4-biphenylyl)-8-methoxy-3H-naphtho-[2,1b]pyran.

Examples of spironaphthopyran compounds may be represented by formula (VIII) as follows:

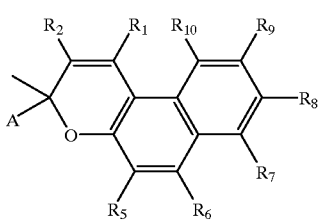

(VIII)

wherein $R_1$, $R_2$, $R_5$ $R_6$, $R_7$, $R_8$, $R_9$, and $R_{10}$, respectively, may be hydrogen; a stable organic radical, such as alkyl, alkoxy, phenyl, naphthyl, cycloalkyl, furyl, alkoyl, alkoyloxy, aroyl, aroyloxy; a heterocyclic group; a halogen; a nitrogen-substituted group, such as amino or nitro; or a nitrogen-substituted ring compound, such as morpholino, piperidino, or piperazino; A is a substituted divalent aromatic radical. The substituents of the divalent aromatic radical may be hydrogen or a stable organic radical such as alkyl, alkoxy, phenyl, naphthyl, cycloalkyl, fury], alkoyl, alkoyloxy, aroyl, or aroyloxy. Additionally, the substituents of the substituted divalent may also be substituted with alkyl, alkoxy, phenyl, naphthyl, cycloalkyl, furyl, alkoyl, alkoyloxy, aroyl, or aroyloxy.

Preferred spironaphthopyran compounds for imparting photochromic effects include 8-methoxyspiro(3H- naphtho [2,1-b]pyran-3,9'-fluorene),spiro(3H-naphtho [2,1-b]pyran-3,9'-fluorene),8-methoxyspiro(3H-naphtho[2,1-b]pyran-3,1'-tetralone),6',7'-dimethoxy-8-methoxyspiro(3H-naphtho [2,1-b]pyran-3,1'-tetralone) 7'-methoxy-8-methoxyspiro (3H- naphtho[2,1-b]pyran 3,1'-tetralone), 2',3'-diphenyl-8-methoxyspiro(3H-naphtho[2,1-b]pyran-3,1'-tetralone) 2'-methyl-8-methoxyspiro(3H-naphtho [2,1-b]pyran-3,1'-tetralone), 2'-methyl-8-methoxy spiro(3H-naphtho(2,I-b] pyran-3,1'-indan), 2',3' diphenyl-8-methoxyspiro (3H-naphtho [2,1-b]pyran -3,1'-indene), 2',3'-diphenyl-8-methoxyspiro(3H- naphtho[2,1-b]pyran-3,1-tetralone), 2'-methyl-8-methoxyspiro(3H-naphtho[2,1-b]pyran-3,1-tetralone), 2'methyl-8-methoxyspiro(3H-naphtho[2,1-b] pyran-indan), and 2',3'-diphenyl-8-methoxyspiro(3H-naphtho[2,1-b]pyran[2,1-b]pyran-3,1'-indene).

Further details and methods for manufacturing the compound of formula (VIII) may be found in the U.S. Pat. Nos. 4,851,530 and 4,913,544, incorporated herein by reference thereto.

A number of photochromic dyes are commercially available from Keystone Aniline Company under the trivial names Reversocal Storm Purple, Plum Red, Berry Red, Corn Yellow, Oxford Blue and the like. Corn Yellow and Berry Red are Chromene compounds, while Storm Purple and Plum Red are Spirooxazics. The general structures of Chromene and Spirooxazene compounds are depicted in FIG. 1.

Preferred metallic additives suitable for use in the present compositions include metals, such as aluminum. Other non-metallic reflective additives such as mica, may also be incorporated to provide a reflective material. It is preferred for the metallic additives to be powdered, and to have a particle size less than about 100 microns. The particles may be spherical or planar flakes. Suitable grades of aluminum particles are sold by the Silberline Corporation under the grades SSP-95020-C, SSP-504AR, ESS-800AR, and ESS-605AR. The properties of these grades are as follows:

TABLE I

| Grade | Mean Particle Size D(50%) | Shape |
|---|---|---|
| SSP-950-20-C | 18 microns | flakes |
| SSF-504-AR | 40 microns | flakes |
| ESS-809-AR | 8 microns | spheres |
| ESS-604-AR | 19 microns | spheres |

Typically, an amount of a metallic particle is added which is sufficient to create a metallic appearance to the article, but is not sufficient to fully block transmission of light through the film. Preferred loading for aluminum particles range from 0.1 to 0.5% by weight. The "flake" shaped metallic particles are preferred because they require less loading to create the same degree of metallic appearance.

The mixing of the solvated compositions of the invention is done by solvent blending. The sequence of addition is not critical but all components should be thoroughly blended. Blending can be done continuously or batchwise. One or more photochromic dyes may be blended with the solvated polycarbonate resin.

The invention will be better understood with reference to the following examples, which are presented for purposes of illustration rather than for limitation, and which set forth the best mode contemplated for carrying out the invention.

The resin and dye and/or metallic particle blends of the invention may be further modified by the addition of other types of additives known to the art of plastics compounding. Such additives can include, for example, impact modifiers, other resins, plasticizers, flow promoters and other processing aids, stabilizers, mold release agents, ultraviolet screening agents and the like.

Preparation 1

A 1000 m four neck flask is fitted with a mechanical stirrer, a pH probe, aqueous caustic inlet tube and a Claisen adapter to which is attached a dry ice condenser and a gas inlet tube. To the flask are added 300 m water, 450 m methylene chloride, 0.7 m triethyl amine (0.005 mole) 57 g (0.25 mole) bisphenol-A, 0–24 g (0.0016 mole) 4-tertiarybutyl phenol, and 0.0125 mole (5 mole% based on bisphenol-A) of terephthaloyl dichloride. With stirring the pH is raised to 10 by the addition of 25% aqueous sodium hydroxide. Phosgene is introduced into the flask at the rate of 1 g/min for 30 minutes (0.3 mole) with the pH maintained at 10 to 11 by the use of said brine solution. The resin layer is separated from the brine layer, washed with 3 weight percent aqueous HC until the washing remains acidic, and twice with distilled water. The resin is then precipitated into 1500 m of methanol in a Waring blender and washed with 500 m more methanol and allowed to air dry.

This resin is then formed into a film by dissolving 5 g of this resin in 95 g of methylene chloride and pouring the solution into a 5 in.×10 in. stainless steel template resting on a glass plate. An inverted glass dish is loosely placed over the glass plate and the solvent is gradually evaporated.

Samples for % haze determination are cut from the center of the film. The % haze values are determined on a Gardner Pivotable-Sphere Hazemeter (Model HG-1204). The results are set forth in Table I, below.

Preparations 2–4

The procedure of Preparation 1, supra., is substantially repeated except that the 0.0125 mole of terephthaloyl dichloride is replaced with 0.0125 mole of other aromatic ester precursors as set forth in Table II, below.

The % haze of these films is determined and the results are set forth in Table II, below.

TABLE II

| Preparation No. | Aromatic Ester Precursor | Mole % Ester Precursor | IV of resin* | % haze of film | thickness of film |
|---|---|---|---|---|---|
| 1 | terephthaloyl dichloride | 5 | 0.596 | 5.7 | 4 mils |
| 2 | isophthaloyl dichloride | 5 | 0.816 | 5.7 | 5 mils |
| 3 | terephthalic acid | 5 | —** | 22.7 | 5 mils |
| 4 | isophthalic acid | 5 | 0.959 | 5.0 | 4 mils |

*Intrinsic Viscosity as determined at 25 C. in methylene chloride.
**Insoluble in methylene chloride.

EXAMPLE 1

To 22.5 g of the resin obtained in the Preparation 1, supra., there is added with mixing 277.5 gm of methylene chloride (10% solution). To 150 gm of the solution there is added with stirring 0.0675 g of Berry Red photochromic dye (Keystone Aniline). The dye may be pre-dissolved in a suitable inert solvent such as butyl acetate; hexane; cyclohexane; various alcohols, including ethanol and methanol; and various ketones; such as cyclohexanone and methyl ethyl ketone. Approximately 6.0 g of the resulting mixture was cast into each of a series of 12 mm molds as described in Preparation 1 above and the solvent allowed to evaporate at room temperature, leaving a polycarbonate resin film with photochromic properties.

EXAMPLE 2

To 300 g of the solution obtained in the Example 1, supra., were added 0.15 g of Cyasorb 5411 (F528) (Cytec), 0.09 g Oxford Blue, 0.0225 g Berry Red and 0.0225 g Corn Yellow (all three photochromic dyestuffs obtained from Keystone Aniline) with mixing. Approximately 30 g of the resulting solution was cast into each of a series of 12 mm diameter molds and the solvent allowed to evaporate, leaving a polycarbonate resin film with photochromic behavior properties.

The photochromic films prepared in accordance with Examples 1–2, supra., are useful to prepare laminate photochromic articles by insert injection molding to adhere them to a lens substrate of polycarbonate resin. The technique of insert injection molding is well known; see for example the descriptions given in U.S. Pat. Nos. 4,898,706 and 4,961,894, both of which are incorporated herein by reference thereto. Advantageously, the molding is carried out by placement of the film insert into the front portion of the mold and the resin substrate is injected at a melt temperature within the range of about 450 F to 500 F.

The film insert may be pre-shaped using any suitable film shaping process.

Prior to molding the article in a molding machine, the film is placed against a recess of the mold plate before the mold halves are closed. The recess may be defined by a notch in the mold surface.

After placement of the film against the recesses, the molding machine is closed to form the mold. The thermoplastic resin is then injected into the cavities in the molten state to fill that portion of the cavities in the molten state to fill that portion of the cavities not occupied by the film and form the laminate article. After the injected resin solidifies, the cavity may be opened by moving the molding halves away from each other.

EXAMPLE 3

This example demonstrates formation of a laminate lens using the film produced in Example 1 to incorporate the photochromic property. The film portion is cut to match the mold shape and is placed against one surface of an open injection mold. The mold 20 halves are then closed. Molten Lexan® polycarbonate resin (General Electric Co., Pittsfield, Mass.) is injected into the mold cavity. The resin melt temperature of the machine is 575 F, and the mold temperature is 180° F.

After cooling, the mold halves are opened and the molded article ejected from the mold half. When tested, the article exhibited photochromic behavior.

EXAMPLE 4

This example demonstrates formation of a polycarbonate film that has a metallic, glittering appearance and incorporates photochromic dyes.

Four different films (A–D) were prepared by making a resin substantially according to Preparation 1, and mixing in the ingredients listed in Table II below to form a homogeneous resin mixture. The resin mixture was formed into a film by drying in a dish. The ingredients listed below are all described supra, with the exception of F528, which is a UV-absorber also known as Cyasorb 5411, available from Cytec.

The weight of each additive listed below in Table III is given in grams. Each experiment was performed by adding the additives to 24.4 g. of resin.

TABLE III

| Additive | A (grams) | B (grams) | C (grams) | D (grams) |
|---|---|---|---|---|
| UV F528 | 0.0248 | 0.0248 | 0.0245 | 0.0241 |
| Dye | | | | |
| Oxford Blue | 0.1099 | 0.1099 | 0.1100 | 0.1093 |
| Purple | 0.0122 | 0.0123 | 0.0125 | 0.122 |
| Claret | 0.0858 | 0.0855 | 0.0856 | 0.0854 |
| Corn Yellow | 0.248 | 0.245 | 0.0248 | 0.0247 |
| AL Particles | | | | |
| SSP-950-20-C | .0309 | | | |
| SSP-504-AR | | 0.0348 | | |
| ESS-809-AR | | | 0.0279 | |
| ESS-605-AR | | | | 0.0284 |

Experiments A-D all contained the same weight of Aluminum pigment (0.1% by weight of resin), but different weights are shown in Table III because the different grades comprise varying amounts of a volatile carrier. Experiment A showed a very heavy metallic appearance, B showed a very fine metallic appearance, and C and D showed no metallic appearance. Therefore, the flake, shaped Aluminum particles provided a superior metallic appearance at lower loading levels.

Although the present invention has been described in considerable detail, with reference to certain preferred versions thereof, other versions are possible. Therefore, the spirit and scope of the appended claims should not be limited to the descriptions of the preferred versions contain herein.

What is claimed is:

1. A process for the manufacture of photochromic polycarbonate resin blends and articles, which comprises;

dissolving a thermoplastic, aromatic polycarbonate resin in an organic solvent to form a dissolved resin;

homogeneously mixing with the dissolved resin, a photochromic effective proportion of a photochromic dye;

casting a film of the mixture; and removing the solvent.

2. The process of claim 1 wherein the polycarbonate resin is a solvent-castable polycarbonate reaction product of
   (1) at least one dihydric phenol;
   (ii) a carbonate precursor; and
   (iii) an effective amount of an aromatic ester precursor to reduce haze.

3. The process of claim 2 wherein said amount of aromatic ester precursor is from about 1 to about 10 mole percent, based on the total amounts of said dihydric phenol and said aromatic ester pre-cursor used.

4. The process of claim 3 wherein said amount of said aromatic ester precursor is from about 2 to about 9 mole percent.

5. The process of claim 1 wherein said aromatic ester precursor is represented by the general formula

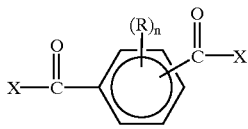

wherein:
   R is independently selected from monovalent hydrocarbon radicals and halogen radicals;
   X is independently selected from hydroxyl and halogen radicals;
   n is a whole number from 0 to 4 inclusive; and
   the —COX radicals are in the meta or para position relative to each other.

6. The process of claim 5, wherein said monovalent hydrocarbon radicals represented by R are selected from alkyl, cycloalkyl, aryl, aralkyl and alkaryl radicals.

7. The process of claim 6 wherein said monovalent hydrocarbon radicals represented by R are selected from alkyl radicals.

8. The process of claim 5 wherein said halogen radicals represented by R are selected from chlorine and bromine.

9. The process of claim 5 wherein n is zero.

10. The process of claim 5 wherein X is a hydroxyl radical.

11. The process of claim 10 wherein n is zero.

12. The process of claim 11 wherein said aromatic ester precursor is selected from isophthalic acid, terephthalic acid, and mixtures thereof.

13. The process of claim 5 wherein X is a halogen radical.

14. The process of claim 13 wherein said halogen radical is chlorine.

15. The process of claim 14 wherein n is zero.

16. The process of claim 15 wherein said aromatic ester precursor is selected from isophthaloyl di-chloride, terephthaloyl dichloride, and mixtures thereof.

17. The process of claim 2, wherein said carbonate precursor is phosgene.

18. The process of claim 17 wherein said dihydric phenol is bisphenol-A.

19. The process of claim 1 wherein the organic solvent is methylene chloride.

20. The process of claim 1 wherein mixing is at room temperature.

21. The film prepared by the process of claim 1.

22. The film of claim 21 insert injection molded to a polycarbonate resin substrate.

23. The article of the process of claim 22.

24. A process for the manufacture of thermoplastic film, which comprises:

dissolving a thermoplastic, aromatic polycarbonate resin in an organic solvent to form a dissolved resin;

homogeneously mixing with the dissolved resin an additive selected from the group consisting of: an amount of non-photochromic dye, an amount of photochromic dye, an amount of metallic particles, and combinations thereof;

casting a film of the mixtures; and removing the solvent.

25. A process for the manufacture of thermoplastic film, which comprises:

dissolving a thermoplastic, aromatic polycarbonate resin in an organic solvent to form a dissolved resin;

homogeneously mixing with the dissolved resin an additive selected from the group consisting of: an amount of non-photochromic dye, an amount of photochromic dye, an amount of metallic particles, and combinations thereof;

casting a film of the mixtures; and removing the solvent, wherein the additive is an amount of metallic particles.

26. A process according to claim 25, wherein the metallic particles are flake shaped.

27. A process for the manufacture of thermoplastic film, which comprises:

dissolving a thermoplastic, aromatic polycarbonate resin in an organic solvent to form a dissolved resin;

homogeneously mixing with the dissolved resin a n additive selected from the group consisting of: an amount of non-photochromic dye, an amount of photochromic dye, an amount of metallic particles, and combinations thereof;

casting a film of the mixtures; and removing the solvent, wherein the additive is an amount of metallic particles together with a photochromic dye.

* * * * *